(12) United States Patent
Sun et al.

(10) Patent No.: US 11,339,056 B2
(45) Date of Patent: May 24, 2022

(54) CONTROLLED, COMPACT, ON-DEMAND AMMONIA GAS GENERATION PROCESS AND APPARATUS

(71) Applicant: Fuel Tech, Inc., Warrenville, IL (US)

(72) Inventors: William H. Sun, Lisle, IL (US); Ronald A. Lau, North Aurora, IL (US); John M. Boyle, Oak Park, IL (US); Scott M. Mayhew, North Aurora, IL (US); David M. Kieffer, North Aurora, IL (US)

(73) Assignee: Fuel Tech, Inc., Warrenville, IL (US)

( * ) Notice: Subject to any disclaimer, the term of this patent is extended or adjusted under 35 U.S.C. 154(b) by 57 days.

(21) Appl. No.: 15/856,802

(22) Filed: Dec. 28, 2017

(65) Prior Publication Data

US 2018/0194639 A1 Jul. 12, 2018

Related U.S. Application Data

(60) Provisional application No. 62/442,640, filed on Jan. 5, 2017.

(51) Int. Cl.
*C01C 1/08* (2006.01)
*B01J 21/06* (2006.01)
(Continued)

(52) U.S. Cl.
CPC ............... *C01C 1/086* (2013.01); *B01J 8/025* (2013.01); *B01J 8/0278* (2013.01); *B01J 19/245* (2013.01);
(Continued)

(58) Field of Classification Search
CPC .. C01C 1/086; C01C 1/08; B01J 8/025; B01J 8/0278; B01J 19/245; B01J 21/063;
(Continued)

(56) References Cited

U.S. PATENT DOCUMENTS 3,652,209 A * 3/1972 Schmidt .................... C01C 3/20
                                                    252/372
5,976,475 A   11/1999 Peter-Hoblyn
                (Continued)

FOREIGN PATENT DOCUMENTS

CN         105107514 A      12/2015

OTHER PUBLICATIONS

Bernhard et al., "Hydrolysis and thermolysis of urea and its decomposition byproducts biuret, cyanuric acid and melamine over anatase TiO2" Applied Catalysis: Environmental, vols. 115-116, Apr. 5, 2012, pp. 129-137. (Year: 2012).*

*Primary Examiner* — Anthony J Zimmer
(74) *Attorney, Agent, or Firm* — OspreyIP, pllc; James R. Cartiglia

(57) ABSTRACT

Disclosed are methods and compact apparatus for controlled, on-demand ammonia generation from urea. The process gasifies an aqueous urea solution in a chamber utilizing hot gas while controlling the flows of aqueous urea solution and hot gas to achieve complete gasification of the aqueous urea solution and form a gas mixture comprising ammonia, isocyanic acid, carbon dioxide and water vapor, which is passed through a catalyst bed containing particulate transition metal oxide to convert substantially all of the isocyanic acid to ammonia. A catalyst support and the catalyst bed are aligned with the gasification chamber at the lower end of said chamber to provide a degree of back pressure on the gases in the gasification chamber to isolate the gasification chamber from turbulent exit effects caused by equipment downstream of the thermal reactor. A sample of the product stream is treated to remove water and ammonia, and analyze for carbon dioxide content to control the process. The apparatus to perform the process includes flow (Continued)

managing equipment and catalyst supports that facilitate continuous operation with accurate control.

10 Claims, 2 Drawing Sheets

(51) Int. Cl.
*B01J 19/24* (2006.01)
*B01J 8/02* (2006.01)
*B01D 53/94* (2006.01)

(52) U.S. Cl.
CPC ............... *B01J 21/063* (2013.01); *C01C 1/08* (2013.01); *B01D 53/9409* (2013.01); *B01J 2208/00548* (2013.01); *B01J 2208/00884* (2013.01); *B01J 2219/00164* (2013.01); *B01J 2219/24* (2013.01)

(58) Field of Classification Search
CPC .... B01J 2208/00548; B01J 2208/00884; B01J 2219/24; B01D 53/9409
See application file for complete search history.

(56) References Cited

U.S. PATENT DOCUMENTS

| | | |
|---|---|---|
| 7,090,810 B2 | 9/2006 | Sun |
| 7,615,200 B2 | 11/2009 | Lin |
| 7,815,881 B2 | 10/2010 | Lin |
| 7,829,033 B2 | 11/2010 | Sun |
| 8,048,390 B2 * | 11/2011 | Hammer ............ B01D 53/9418 423/32 |
| 8,591,848 B2 | 11/2013 | Sun |
| 8,951,492 B2 | 2/2015 | Sun |
| 9,409,137 B1 * | 8/2016 | Williams ................. B01J 8/025 |
| 2009/0214397 A1 * | 8/2009 | Shirono ............. B01D 53/9431 422/177 |
| 2009/0297417 A1 | 12/2009 | Sun et al. |

\* cited by examiner

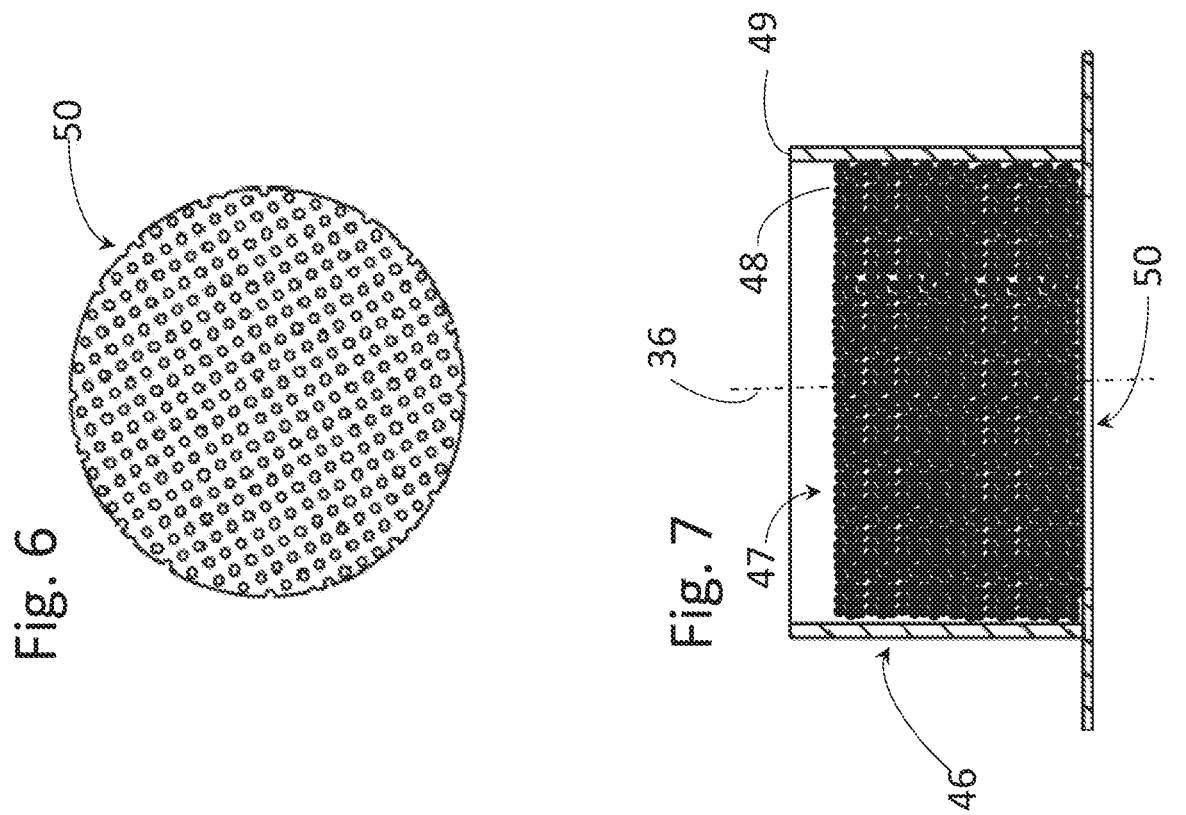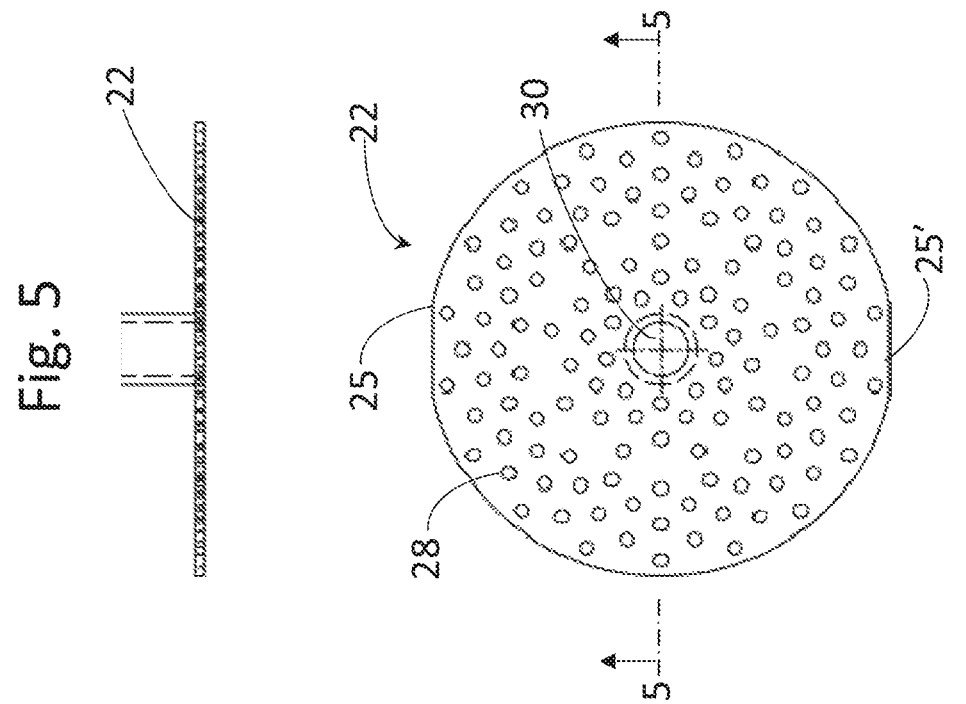

CONTROLLED, COMPACT, ON-DEMAND AMMONIA GAS GENERATION PROCESS AND APPARATUS

FIELD OF THE INVENTION

The invention relates generally to controlled, compact, on-demand ammonia generation from urea. On-demand ammonia production has proved to be important from technical and safety standpoints, but reactor design and difficulties in process control continue to present technical challenges. The invention provides significant process and apparatus improvements.

BACKGROUND OF THE INVENTION

The art has provided processes for gasifying urea by thermal treatment, but the required operating conditions and chemistry continue to present technical challenges, especially where space is limited and ammonia is required in high concentration.

Most combustion processes are conducted at high temperatures that produce nitrogen oxides ($NO_x$) in the exhaust gases, which are typically treated with a nitrogenous $NO_x$-reducing agent like ammonia or urea. The reaction between the NOR-reducing agent and the NOR is temperature dependent and can be effected either with or without a catalyst. The most direct chemical route calls for ammonia, but safety dictates using a precursor like urea. The urea is typically supplied in aqueous solution and then gasified by thermal action, with or without catalysts.

For automotive uses, Diesel engines produce the highest $NO_x$ concentrations because they are usually tuned for maximum efficiency, which increases the production of $NO_x$ to levels that require the use of an agent like urea or ammonia. While high, the NOR concentrations are still only in the parts per million range, and the amount of nitrogenous agent, e.g., ammonia or urea, need be only on an equivalent level. The required concentrations of ammonia virtually never exceed several hundred parts per million or, in other words, less than even 0.1%. It is common to introduce an aqueous urea as AdBlue, as it is known in Europe, or Diesel Exhaust Fluid, as it is called in the U.S. The technology is well established to operate with or without a catalyst to break down the urea but is never operated at high rates of introduction. This makes it a very well-solved technical problem that can operate for long periods without serious problems. These systems typically introduce a fine spray of aqueous urea into a horizontal exhaust pipe where it is quickly gasified. With proper baffling and mixing, deposits on exhaust pipe walls are easily prevented while the supply of ammonia to a $NO_x$ reduction catalyst is maintained at sufficient levels to treat the exhaust. These systems are, however, designed for low-demand use and the designs do not permit them to be scaled up to produce ammonia from urea at levels of 0.5% or higher. Simply increasing the size of the units would not increase the percentage of ammonia in the exiting gas stream. It would simply increase the size of the apparatus.

As distinguished from low-concentration requirements for vehicle pollution control systems, many industrial uses require high production of ammonia within a limited space. While the equipment producing $NO_x$ can be large, there is typically no floor space reserved for ammonia generation, especially in retrofit situations. This demands that any ammonia supply system must be much more compact relative to ammonia produced. While there are references that discuss converting urea to ammonia for high-demand industrial and power plant systems, none are as compact as is desired and often necessary. Principal among the known systems, from the inventors' standpoint, are high-temperature processes such as U.S. Pat. No. 7,090,810 to Sun, et al., which describes a thermal process that can produce complex product gas streams that can present process control challenges. Unfortunately, the measurement of ammonia at the concentrations typically present in the product streams from this and like processes having ammonia concentrations of 1% or more is difficult and tends to be imprecise. This can make process control more difficult than is practical or economical for many industrial applications.

While initial industrial-scale designs for producing ammonia from urea attempted to accomplish the desired conversion without the aid of a hydrolysis catalyst, it has more recently been thought that the use of a hydrolysis catalyst following initial thermal breakdown of urea could be beneficial. In one such application, the production of a temperature-stable product stream from urea is discussed in U.S. Pat. No. 8,951,492. While certainly an advance, the apparatus described had several difficulties. First, the high concentrations of ammonia in the product stream made analysis problematic. Secondly, the mixed oxide hydrolysis catalysts, which often contained vanadium dioxide, needed to be preheated and prewetted prior to start up. This prewetting of the catalyst would cause the temperature of the catalyst to increase rapidly. Moreover, when the aqueous urea flow to the reactor was started, there would be an even greater and more rapid temperature increase that would sometimes become too great and force the operator to shut down and wait for the equipment to cool down.

Moreover, the prior art systems imposed space problems because the earlier designs required a distinct convergence section between a first stage thermal reactor and a separate hydrolysis reactor. The separate convergence section was needed to overcome turbulent exit effects on the gases coming out of the thermal reactor. These exit effects would adversely affect gas flow in the thermal reactor.

It has been known that SCR catalysts were effective for hydrolysis, and SCR catalysts, in some cases spent SCR catalysts, became used for hydrolysis following thermal breakdown of urea. Unfortunately, these catalysts were often found to be too active and cause undesired heating. While compact systems would seem to be improved by active catalysts, better catalysts are called for to provide effective hydrolysis for high output without adverse heating encountered.

There is a present need for a process and apparatus for efficient supply of ammonia from urea in a continuous, compact, on-demand system in a well-controlled manner that requires minimal intervention.

SUMMARY OF THE INVENTION

The present invention provides processes and apparatus for efficient supply of ammonia from urea in a continuous, compact, on-demand system.

In one aspect, a process for producing an ammonia-containing gas stream, comprising: providing means for introducing an aqueous solution of urea and a hot gas having a temperature greater than 600° F. into a vertically-oriented gasification chamber having an upper end, a lower end and an outer wall; supplying hot gases tangentially to the upper end of the vertically-oriented gasification chamber and passing it through a foraminous plate located near the upper end of the vertically-oriented chamber to provide well-ordered, linear, downward flow of hot gas in said gasification chamber; injecting the aqueous urea solution from a nozzle located proximate a central opening in said foraminous plate to flow concurrently with hot gas; controlling the flows of aqueous urea solution and hot gas to achieve complete gasification of the aqueous urea solution and form a gas mixture comprising ammonia, isocyanic acid, carbon dioxide and water vapor; advancing the gas mixture comprising ammonia, isocyanic acid, carbon dioxide and water vapor through a catalyst bed containing particulate titanium dioxide principally in the anatase crystalline form to convert substantially all of the isocyanic acid to ammonia in a product stream.

In another form, the invention provides process improvements including the additional feature of controlling the temperature of the hot gas to maintain the temperature of the product stream at a temperature of greater than 400° F.

In another aspect, the process of the invention calls for: treating a sample of the product stream to remove water and ammonia, and analyzing the sample for carbon dioxide content; comparing the carbon dioxide content as measured to reference values; and based on the comparison, adjusting flows of aqueous urea solution and/or hot gas and/or hot gas temperature.

Among other improvements is positioning a catalyst support and the catalyst bed such that a central vertical axis of it is aligned with a central vertical axis of the vertically-oriented gasification chamber and is centrally-located at the lower end of said vertically-oriented gasification chamber to provide a degree of back pressure on the gases in the gasification chamber to isolate the gasification chamber from turbulent exit effects caused by equipment downstream of the thermal reactor.

In one form of the invention, the gas mixture comprising ammonia, isocyanic acid, carbon dioxide and water vapor is passed through a catalyst bed containing pelletized transition metal oxide hydrolysis catalyst loosely held by a catalyst support. A preferred catalyst comprises titanium dioxide principally in the anatase crystal form.

In another principal aspect, the invention provides an apparatus for preparing an ammonia-containing gas stream, comprising: a vertically-oriented gasification chamber having an upper end, a lower end and a closed sidewall; an inlet for introducing hot gas into the upper end of said vertically-oriented gasification chamber; a foraminous plate located in the vertically-oriented chamber and positioned below the inlet for introducing hot gas to enable a well-ordered, linear, downward flow of hot gas through said chamber; at least one injector located near said upper end of said vertically-oriented chamber for introducing an atomized spray of an aqueous urea solution into said well-ordered, linear, downward flow of hot gas in said gasification chamber; a porous catalyst support for holding a bed of pelletized titanium dioxide catalyst aligned with a central vertical axis of the vertically-oriented gasification chamber and centrally-located at the lower end of said vertically-oriented gasification chamber; an outlet communicating the catalyst support with a duct for carrying a product stream containing ammonia from the chamber.

Other and preferred aspects of the invention are described below.

DESCRIPTION OF THE DRAWINGS

The accompanying drawings, which are incorporated in and constitute a part of this description, illustrate presently preferred embodiments of the invention, and together with the detailed description of the preferred embodiments given below, serve to explain the principles of the invention. As shown throughout the drawings, like reference numerals designate like or corresponding parts.

FIG. 4 is a top plan view of a foraminous plate for controlling vertical gas flow in an apparatus of the invention.

FIG. 5 is a side cross-sectional view taken along line 5-5 in FIG. 4 of a foraminous plate for controlling vertical gas flow in an apparatus of the invention.

FIG. 6 is a top plan view of a foraminous plate for holding the hydrolysis catalyst.

FIG. 7 is a partially cut away side elevation view of a catalyst holder according to the invention.

DETAILED DESCRIPTION OF THE INVENTION

Figure 1:
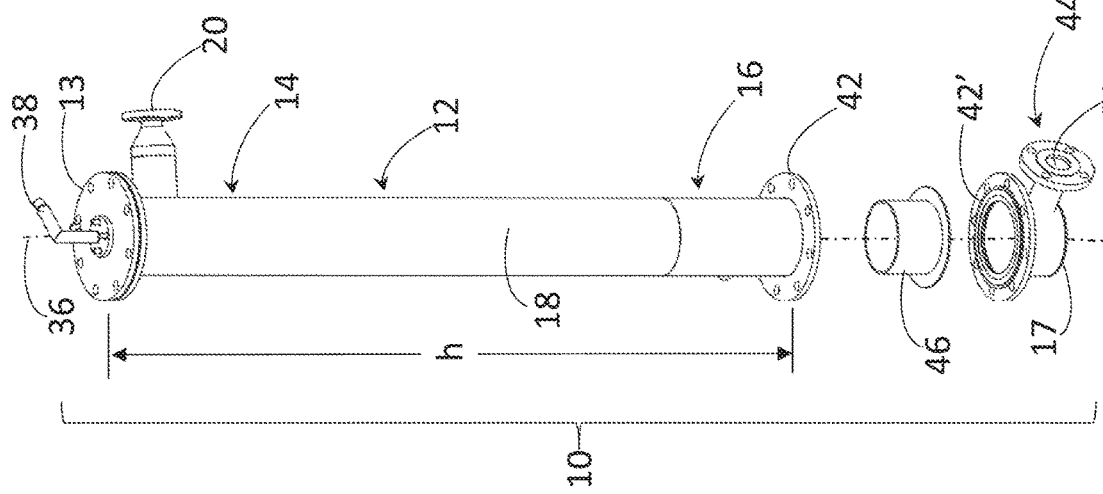
FIG. 1 is an exploded side perspective view of an apparatus according to the invention.

In describing the present invention, reference is made to the drawings, wherein there is seen a simplified, preferred embodiment of the apparatus shown schematically in FIG. 1, with various details illustrated in FIG. 2 through FIG. 7. The drawings and the process they represent will be described briefly below.

The term "urea" is meant to encompass urea in all of its commercial forms that will typically consist essentially of urea, containing 95% or more urea by weight. This relatively pure form of urea is preferred and has several advantages in the process of the invention. The urea is preferably supplied to the process as an aqueous solution at a concentration of from about 30 to about 70%, with lower concentrations in this range being most typical. In an embodiment, the aqueous urea will have a urea concentration of about 40%.

By the term "gasification" we mean that substantially all of the urea is converted into a gas, leaving no significant dissolved or free solids or liquid.

By the term "particulate" we mean to include granular and pelletized particles regardless of the method of formation which have a major dimension of at least 1 mm. Particles in the form of pellets formed by compression or extrusion and cutting are typical.

FIG. 1 is an exploded perspective view of an apparatus 10 according to the invention and is shown to comprise a vertically-oriented gasification chamber 12 having an upper end 14, a lower end 16 and a closed sidewall 18. An inlet 20 is provided for introducing hot gas into the upper end 14 of the vertically-oriented gasification chamber 12. A foraminous plate 22 (see FIG. 3) is located in the vertically-oriented chamber 12 and positioned below the inlet 20 for introducing hot gas to enable a well-ordered, linear, downward flow of hot gas through said chamber. At least one injector 24 (see FIG. 3) is located near the upper end 14 of the vertically-oriented chamber for introducing an atomized spray of an aqueous urea solution into the hot gas in the gasification chamber.

The apparatus of the invention is very compact for its capability in supplying ammonia on an industrial scale. The vertical chamber 12 is typically cylindrical, with a diameter $d_r$ which is from about 5 to about 30% of the height h of the chamber 12. In one form, the chamber 12 is 6 inches in diameter and about 4 feet high. Hot gas at a temperature above about 600° F. is supplied through inlet duct 20 in a controlled regular flow that rapidly vaporizes the water in the aqueous urea solution and fully gasifies the solution. In one form, the vertical, linear gas velocity will be about 2 to about 4 feet per second.

Inlet duct 20 is shown located near the upper end 14 of the vertically-oriented gasification chamber 12 and has a central axis 34 that is transverse to but offset from a central axis 36 of the vertically-oriented gasification chamber 12 so that the flow into the chamber is tangential and provides a cyclonic flow of gas into the gasification chamber 12 near the upper end 14 of the chamber. The inlet duct 20 has a diameter $d_i$ which is smaller than $d_r$ of chamber 20, typically being on the order of half of $d_r$. This arrangement will cause cyclonic flow in gas distribution chamber 15, which is defined as the space below top plate 13 and above foraminous plate 22. The foraminous plate 22 is shown located below duct 20 and near the upper end 14 of the vertically-oriented chamber 12, causes air flow through plate 22 to be very uniform and become vertically linear as it flows past the plate 22 and downward through chamber 12. Typically, the vertical extent of gas distribution chamber 15, $h_1$, will be less than about 3 times of $d_r$, e.g., from 1.5 to 2.

An injector 24 is fed aqueous urea solution from a source (not shown) through supply line 38. The injector 24 can be of the dual fluid type, which requires atomizing air, or of the airless type, such as one described in U.S. Pat. No. 5,976,475 or others that have been developed for automotive use. The nozzle 40 is typically located proximate a central opening in said foraminous plate 22. It can be at, above or below the lowest surface of plate 22.

Figure 3:
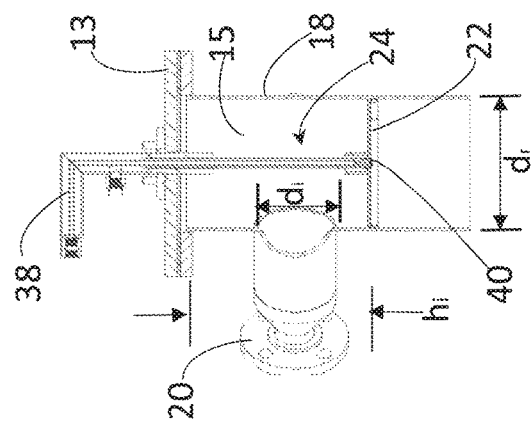
FIG. 3 is a partially cut away side elevation view of the upper portion of an apparatus according to the invention.
Figure 2:
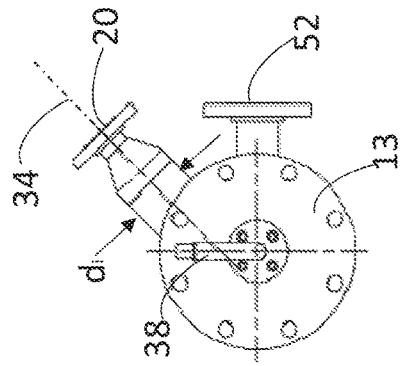
FIG. 2 is a top plan view of an apparatus according to the invention.

It will be useful to refer to FIGS. 3 through 5 at this point to understand the configuration and construction of the plate 22 and its position in the chamber 12. FIG. 3 provides a side elevation view of the upper section of an apparatus of the invention which is partially cut away to show the position of foraminous plate 22 in the interior of the chamber 12 for controlling vertical gas flow in the vertically-oriented internal chamber 12. In FIG. 4 a foraminous plate 22 is shown with slight cut side edges 25 and 25' to permit an easy fit upon insertion into the cylindrical wall 18 to facilitate proper positioning to enable best control vertical gas flow in the chamber 12.

FIG. 4 is a top plan view of a foraminous plate 22 and FIG. 5. is cross-sectional view taken along line 5-5 in FIG. 4. Plate 22 can be welded in place, if desired. By providing a regular pattern of holes 28 in the plate 22, the gas entering the top of the chamber via inlet duct 20 can be controlled by directing it in a vertical gas flow through the chamber 12. As will be described, central opening 30 is provided to accommodate a nozzle 40 for introducing aqueous urea.

The lower end 16 of the chamber 12 is shown to include mating flanges 42 and 42' which are provided in this embodiment to attach a lower end section 44 of the chamber 12 and a catalyst support 46 for holding a catalyst bed 47 of pelletized transition metal oxide catalyst 48 aligned with a central vertical axis 36 of the vertically-oriented gasification chamber. The catalyst support 46 can be fully foraminous or have solid side walls 49 holding a lower (and upper, if desired) foraminous member 50 to contain the catalyst. The catalyst is desirably particulate form, e.g., in pellet form.

Among the preferred transition metal catalysts are titanium dioxide, preferably principally in the anatase crystalline form. Anatase is one of the three mineral forms of titanium dioxide, the other two being brookite and rutile. It is always found as small, isolated and sharply developed crystals, and like rutile, a more commonly occurring modification of titanium dioxide, it crystallizes in the tetragonal system. The anatase form is desirably present for at least 50%, e.g., at least 75% of the titanium dioxide catalyst.

The catalyst particles, e.g., pellets can be of practical size, with a generally cylindrical shape of from 3 to 6 mm in major dimension being typical. Surface areas of the particles can typically be above about 50 $m^2$/gram, e.g., within the range of from 100 to 200 $m^2$/gram. Bulk or packing densities will typically be less than 1 kg/liter. Among other effective catalysts containing transition metal oxides are $Al_2O_3$, $SiO_2$, $ZrO_2$, and Fe-ZSM5. It has been found that catalysts of this type to be most effective should be substantially free of vanadium, with vanadium pentoxide (vanadia) contents of less than 1% and preferably less than 0.5% based on the weight of the catalyst.

The catalyst bed 47 is shown positioned such that a central vertical axis of it is aligned with a central vertical axis 36 of the vertically-oriented gasification chamber 12 and is centrally-located at the lower end of said vertically-oriented gasification chamber 12 where the titanium dioxide catalyst is loosely held by a catalyst support 46. This arrangement provides advantages not found in other arrangements. Specifically, the alignment as described provides an important degree of back pressure on the gases in the gasification chamber to isolate the gasification chamber from turbulent exit effects caused by equipment downstream of the thermal reactor. The gases are not turned on exit from the chamber 12 thereby reducing adverse turbulence that would be caused by turning the gas stream from the vertical chamber 12 to the catalyst bed 47 through a separate catalyst chamber. This arrangement provides a pressure drop through the catalyst bed that is sufficient to stabilize flow out of it, and is typically less than about 5 inches of water column, e.g., from 2 to 4.

The catalyst support 46, is centrally-located at the lower end of said vertically-oriented gasification chamber. The outlet 52 below the catalyst support 46 provides communication between the catalyst support 46 and outlet 52 for carrying a product stream containing ammonia from the chamber 12. The vertical extent of the catalyst bed 47 can be desirably from about 0.2 to about 2.0 times $d_r$.

In operation, aqueous urea will be fed to the chamber 12 via line 38 to injector 24; and hot gas, which can be heated air or process gas such as from a furnace, is fed via duct 20. In the chamber 12, urea is gasified thermally and is substantially completely converted to the gas phase prior to contact with the catalyst. Complete gasification of the aqueous urea solution will produce a gas mixture comprising ammonia, isocyanic acid, carbon dioxide and water vapor.

To start the process, the hydrolysis catalyst should be low in or free of vanadia assure successful startup. The catalyst is preheated by passing hot gases though it, preferably a degree of precondition with moist air or steam. Preconditioning of the catalyst has in the past was required to moderate temperature increase of the catalyst. Sometimes temperatures above 550° F. would occur and caused problems. It often happened that the temperature would become too great and force the operator to shut down and wait for the equipment to cool down. Now operation can be started with little or no preconditioning.

According to the process, an aqueous urea solution is fed to an injector 24 at an upper end 14 of vertically-oriented gasification chamber 12. The urea solution is introduced to flow concurrently with hot gas, the hot gas having a temperature of greater than 600° F. for effective process control, the temperature of the gases exiting at 52 can be monitored and the temperature of the hot gas supplied to inlet 20 can be adjusted as necessary to maintain the temperature of the gases exiting at 52 to be greater than 400° F. The flow rates of aqueous urea and the hot gas and the temperature of the hot gas are controlled by a suitable controller, not shown. In one embodiment, the chamber 12 is 6 inches in diameter and about 4 feet high. For this chamber, aqueous urea at a urea concentration of about 40% is fed at a rate of about 0.3 to about 1.2 gallons per hour, e.g., less than about 0.8 gallons per hour with hot gas at 800° F. at a rate of just over 900 scfh. In one form, atomizing air is fed to the injector at a rate of about 60 scfh to atomize the aqueous urea. When operated at these rates, the process can produce about 0.5 to about 2.0, e.g., about 1 pound per hour of ammonia.

The invention permits control of the production of ammonia with great precision by relying on measuring the carbon dioxide in the product stream as opposed to measuring ammonia as prior processes have done. Direct measurement of $NH_3$ through wet chemistry methods is labor intensive and its accuracy is insufficient. Tunable Diode Laser Absorption (TDLAS) or other ammonia ($NH_3$) analyzers to measure at high $NH_3$ concentrations, e.g., in excess of 2%, as can be present in the product streams produced by the invention, are inaccurate, expensive and difficult to maintain. According to the invention, it has been determined that carbon dioxide ($CO_2$) can be accurately measured and the measured amount correlated to the ammonia concentration with excellent accuracy.

When aqueous urea is heated, a number of chemical reactions, controlled by temperature-dependent rate constants, determine how urea is broken down:

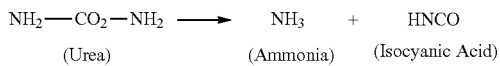

This reaction can occur at a temperature of 275° F.; and the HNCO, is hydrolyzed to moderate or eliminate the possible negative effects of passing it downstream at low temperature:

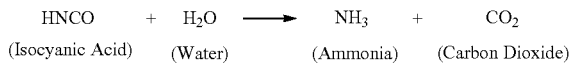

Thus, because HNCO hydrolyzes to form $NH_3$ and $CO_2$, $CO_2$ instruments that can measure concentrations on the order of even 1% have been found accurate. By measuring $CO_2$ in this manner, the process operation can be controlled to maintain the theoretical conversion efficiency.

In operation of the process, a sample of the product stream is treated to remove water and ammonia and analyzed for carbon dioxide content. The water can be removed by condensation with a coil or trap or by the use of a desiccant. The measured carbon dioxide content is then compared to reference values, typically using a controller using a programmable digital computer. Based on the comparison, flows of aqueous urea solution and/or hot gas and/or hot gas temperature are adjusted as necessary to achieve target levels of production and quality.

Operation with the necessary flow rates of aqueous urea solution and hot gas and process temperatures enables complete and continuous gasification of the aqueous urea solution. The gas mixture exiting the chamber 12 and exiting the catalyst bed 47 will be a gas mixture comprising ammonia, isocyanic acid, carbon dioxide and water vapor. Advancing this gas mixture through a catalyst bed as described converts substantially all of the isocyanic acid to ammonia and carbon dioxide.

The molar ratios of gas to water to urea will most effectively be from about 100:3:1 to about 50:5:1, e.g., 80:5:1. The molar ratios of water to urea will most effectively be from about 3.3:1 to 7:1, preferably within the range of from 4:1 to 5:1.

In the chamber 12 it is important to employ suitably high temperatures, obtain a small droplet size of urea in the chamber and avoid the presence of cold spots. Droplet sizes are preferably controlled to be less than 200 µm, typically less than 100 µm, as measured by laser techniques. Residence time in the chamber is necessarily short, e.g., on the order of less than 4 seconds, typically from 1 to 2 seconds.

The amount of water present for hydrolysis will include that added by both the urea solution, including dilution water, if any, and the system gas, and must be sufficient to fully hydrolyze the HNCO in the second stage of the process. Because water is characterized by an enthalpy of vaporization, 40.65 kJ/mol, more than five times the energy required to heat the same quantity of water from 0° C. to 100° C., any excess water should be avoided, but this has not been a concern of the prior art.

The heated gases entering stage one gasification chamber 12 via inlet 41 will gasify the urea, principally to ammonia and isocyanic acid (HNCO), leaving essentially no liquids or solids. The gases entering chamber 12 will preferably be within the range of from 600° to 1200° F. at inlet and will be sufficient to fully gasify the aqueous urea solution for their time in the gasification reactor. The gas mixture entering the catalyst following the chamber 12 will be above at least 400° F., e.g., at least 500° F. for contact with the catalyst, which is typically maintained at a temperature of from 350 to 600° F.

The gases are preferably heated to greater than 600° F. prior to being introduced into the chamber 12 at a temperature where they should remain above at least 600° F. Entering gas temperatures of up to about 1200° F. can be employed effectively. Supplemental heat can be supplied to the chamber as necessary. And, preferably, the chamber 12 will be well insulated to aid in temperature maintenance. The temperature of the gases and the residence time prior to exit from the chamber 12 will be effective to achieve full gasification. The entry temperature and temperature maintenance in chamber 12 should be high enough also to maintain an exit temperature of at least about 400° F., e.g., at least 450° F. and preferably at least 500° F.

If necessary, heating can be employed following gasification and as being transferred into catalyst chamber 46, but it is preferred that the gases entering chamber 46 will be hot enough to provide an exiting gas meeting the above criteria. Temperatures within catalyst chamber 46 are desirably within the range of from 350 to 600° F., and preferably within the range of from 400 to 500° F.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

What is claimed is:

1. A process for producing an ammonia-containing gas stream having an ammonia concentration in excess of 2% in a continuous, on-demand system, comprising:
    a. introducing an atomized spray of an aqueous solution of urea and a hot gas having a temperature sufficient to thermally gasify the urea into a vertically-oriented gasification chamber having an upper end, a lower end and an outer wall, where the gasification chamber has a diameter which is from about 5 to about 30% of its height and residence time in the gasification chamber is less than 4 seconds;
    b. controlling the flows of aqueous urea solution and hot gas to achieve gasification of the aqueous urea solution and form a gas mixture comprising ammonia and isocyanic acid; and
    c. advancing the gas mixture through a catalyst support located at the lower end of the gasification chamber wherein the gas mixture is at a temperature of at least 500° F., and further wherein the catalyst support comprises a catalyst bed comprising a pelletized catalyst and has a lower foraminous member and is aligned with a central axis of the gasification chamber to create a pressure drop of less than 5 inches of water column.

2. A process according to claim 1, including the further steps of:
    a. analyzing a sample of the product stream for carbon dioxide content;
    b. comparing the carbon dioxide content as measured to reference values by means of a programable digital computer; and
    c. based on the comparison, adjusting flows of aqueous urea solution and/or hot gas and/or hot gas temperature as necessary to achieve target levels of production and quality.

3. A process according to claim 1, comprising:
    a. providing an injector for introducing an atomized spray of an aqueous solution of urea and a hot gas having a temperature greater than 600° F. into a vertically-oriented gasification chamber having an upper end, a lower end and an outer wall;
    b. supplying hot gas tangentially to the upper end of the vertically-oriented gasification chamber and passing the hot gas through a foraminous plate located near the upper end of the vertically-oriented gasification chamber to provide linear, downward flow of hot gas in said gasification chamber;
    c. injecting aqueous urea solution from a nozzle located below said duct to supply hot gas to introduce said aqueous solution of urea through a central opening in said foraminous plate to flow concurrently with hot gas;
    d. controlling the flows of aqueous urea solution and hot gas to achieve complete gasification of the aqueous urea solution and form a gas mixture comprising ammonia, isocyanic acid, carbon dioxide and water vapor;
    e. advancing the gas mixture comprising ammonia, isocyanic acid, carbon dioxide and water vapor through a catalyst bed containing particulate transition metal oxide to convert the isocyanic acid to ammonia and produce a product stream containing ammonia;
    f. wherein the catalyst bed is positioned such that a central vertical axis of it is aligned with a central vertical axis of the vertically-oriented gasification chamber and is centrally-located at the lower end of said vertically-oriented gasification chamber to provide a degree of back pressure on the gases in the gasification chamber to isolate the gasification chamber from turbulent exit effects caused by equipment downstream of the thermal reactor and the catalyst is in pellet form and held by a foraminous support member.

4. A process according to claim 1, wherein the catalyst comprises titanium dioxide principally in the anatase crystal form.

5. A process according to claim 1, wherein the catalyst bed comprises a pelletized transition metal oxide with a vanadia content of less than 1%, to convert the isocyanic acid to ammonia and carbon dioxide and produce a product stream.

6. A process according to claim 5, wherein the catalyst bed has a height of about 0.2 to about 2.0 times the diameter of the gasification chamber.

7. A process according to claim 6, wherein the transition metal oxide is titanium dioxide.

8. A process according to claim 5, wherein the catalyst comprises a transition metal oxide selected from the group consisting of titanium dioxide, aluminum oxide, silicon dioxide, zirconium dioxide, iron-modified ZSM-5 zeolites, and mixtures thereof.

9. A process according to claim 1, further comprising:
    a. supplying hot gas tangentially to the upper end of the gasification chamber and passing the hot gas through a foraminous plate to supply hot gas into the upper end of the gasification chamber to provide linear, downward flow of hot gas in said gasification chamber; and
    b. injecting the aqueous urea solution so as to introduce said aqueous solution of urea through a central opening in said foraminous plate to flow concurrently with hot gas.

10. A process according to claim 1, wherein the catalyst support is aligned with the gasification chamber to isolate the gasification chamber from turbulent exit effects caused by equipment downstream of the thermal reactor.

* * * * *